United States Patent [19]

Gemmill

[11] 3,909,175
[45] Sept. 30, 1975

[54] INJECTION MOULDING RUNNER AND PROCESS

[75] Inventor: Robert George Gemmill, Brampton, Canada

[73] Assignee: Du Pont of Canada, Limited, Montreal, Canada

[22] Filed: Mar. 8, 1973

[21] Appl. No.: 339,423

[52] U.S. Cl. ............................ 425/242 R; 425/247
[51] Int. Cl.² ........................................ B29C 1/00
[58] Field of Search .......... 425/242, 244, DIG. 229, 425/245, 247, 248, 250

[56] References Cited
UNITED STATES PATENTS

| | | |
|---|---|---|
| 3,189,945 | 6/1965 | Strauss .......................... 425/250 X |
| 3,238,568 | 3/1966 | Barnett et al. ............. 425/DIG. 229 |
| 3,520,026 | 7/1970 | Stidham et al. ...................... 425/242 |
| 3,537,139 | 11/1970 | Segmuller ...................... 425/247 X |

*Primary Examiner*—Francis S. Husar
*Assistant Examiner*—Robert J. Charvat

[57] ABSTRACT

An improved runner for injection moulding apparatus is disclosed. The runner has at least one additional cavity adjoining the elongated cavity of the runner at a maximum distance of three times the average diameter of the runner from the gate land. A process using the improved runner is also disclosed.

9 Claims, 2 Drawing Figures

INJECTION MOULDING RUNNER AND PROCESS

This invention relates to an improved runner, and in particular to a T-shaped runner for an injection moulding apparatus, the runner being adapted to facilitate moulding of articles of reduced stress in a short moulding cycle.

The injection moulding of polymers, and in particular acrylic polymers, is well known. Injection moulding articles manufactured from acrylic polymers are widely used in the automotive industry, for example as tail-light lenses, instrument panel dials, and decorative medallions, in the lighting and advertising industries, for example as signs and street light lenses, and in optical lenses. Many of these end uses utilize the optical properties of acrylic polymers.

A typical injection moulding apparatus comprises means to inject molten polymer, a runner, a gate, and a mould all connected in series. The runner is a cavity along which molten polymer is injected during the filling of the mould with polymer. The gate connects the runner to the mould and is usually of smaller cross-sectional area than the runner. The section of the runner connecting to the gate is referred to hereinafter as the gate land. The terms runner, gate land, and gate are known in the art.

The design of runner and gates is discussed in "Moulding Manual for Du Pont Lucite Acrylic Resins" obtainable from E. I. du Pont de Nemours and Company. (Inc.), Plastics Department, Wilmington, Del. 19898, U.S.A.

The properties of the articles made by the injection moulding of acrylic polymers may depend on the moulding technique employed. For example, some moulding techniques result in the production of moulded articles having areas of high stress and such areas may be susceptible to breaking or cracking on impact with another object and, moreover, these stressed areas may not exhibit acceptable optical properties. Techniques for the manufacture of articles having minimal stress are known but these techniques may be characterized by long moulding cycles. Moreover, the articles moulded by such techniques normally require machining to the desired dimensions in a post-moulding step, machining being a term used to describe trimming or finishing operations used to remove extraneous parts of the moulded article. The extraneous parts of the moulded article are the portions of polymer remaining on the moulded article after the runner/gate sections have been cut or broken off from the moulded article. Some of the runner/gate systems requiring post-moulding machining of the moulded article are referred to as tab gates, sprue gates, and flash gates in the moulding manual referred to hereinabove.

Designs of runner and gate systems that overcome the necessity for post-moulding machining operations are known. However, articles moulded with these runner and gate systems are usually characterized by areas of high stress and/or long moulding cycles. The stress in the moulded article may be related to the melt flow pattern during the injection moulding of the article.

It has now been found that the incorporation of an additional cavity(ies) in the runner immediately prior to the gate permits the injection moulding of articles of reduced stress using short moulding cycle times. Moreover, the necessity of subsequent machining of the moulded article is substantially eliminated.

Accordingly, the present invention provides, in an injection moulding apparatus comprising polymer injection means, an elongated runner cavity, a gate land, a gate, and a mould all connected in series, said runner cavity being of average diameter $\alpha$, the improvement wherein at least one additional cavity is provided in said runner, said additional cavity adjoining said elongated runner cavity and being at a maximum distance of three times $\alpha$ from said gate land.

Also provided is, in a process for the injection moulding of polymer comprising injecting polymer through an elongated runner cavity, a gate land, a gate and into a mould, said runner cavity being of average diameter $\alpha$, the improvement which comprises using a runner having at least one additional cavity, said additional cavity adjoining said elongated runner cavity and being at a maximum distance of three times $\alpha$ from said gate land.

Runners known in the art are essentially elongated cavities usually of circular, semi-circular, or trapezoidal cross-section. Such runners are usually comprised of linear sections often combined with one or more curved sections.

In practicing the present invention at least one additional cavity is incorporated into the runner at a distance from the gate land of not more than three times the average diameter ($\alpha$) of the runner. As used herein, the distance of the additional cavity from the gate land is measured from the junction of the gate land and the runner to that portion of the additional cavity that is nearest the gate land.

If the runner is of circular or semi-circular cross-section, the diameter of the runner ($\alpha$) is defined as the diameter of the circle (or semi-circle) of the cross-section. When the runner is of trapezoidal cross-section the average diameter is defined as average of the lengths of two diagonals. Similarily, with runners of other cross-sections, the average diameter should be understood to be the average of the diagonals, or the like, of the cross-section.

The size, number, and shape of the additional cavity(ies) are variable. When more than one additional cavity is provided, as in a preferred embodiment, the additional cavities may be of different size and shape but it is preferred that the additional cavities be of similar size and shape and at similar distances from the gate. In one embodiment of the present invention, two additional cavities are symmetrically positioned about the axis of the runner.

In preferred embodiments, the angle formed by the axis of the runner cavity and the edge of the additional cavity(ies) is about 90° on the side of the additional cavity(ies) nearest the gate land and not greater than about 90° on the side of the additional cavity(ies) farthest from the gate land, the angles being described in more detail hereinafter. Preferably, the diameter of the additional cavity where this cavity contacts the cavity of the runner, hereinafter diameter $\gamma$, is at least about the average diameter ($\alpha$) of the runner. Also, the length of the additional cavity, namely the distance from where the additional cavity meets the cavity of the runner to the deepest part of the additional cavity, hereinafter cavity length $\beta$, is preferably at least about the average diameter ($\alpha$) of the runner.

The invention will now be further described with reference to the accompanying drawings in which.

Figure 1:
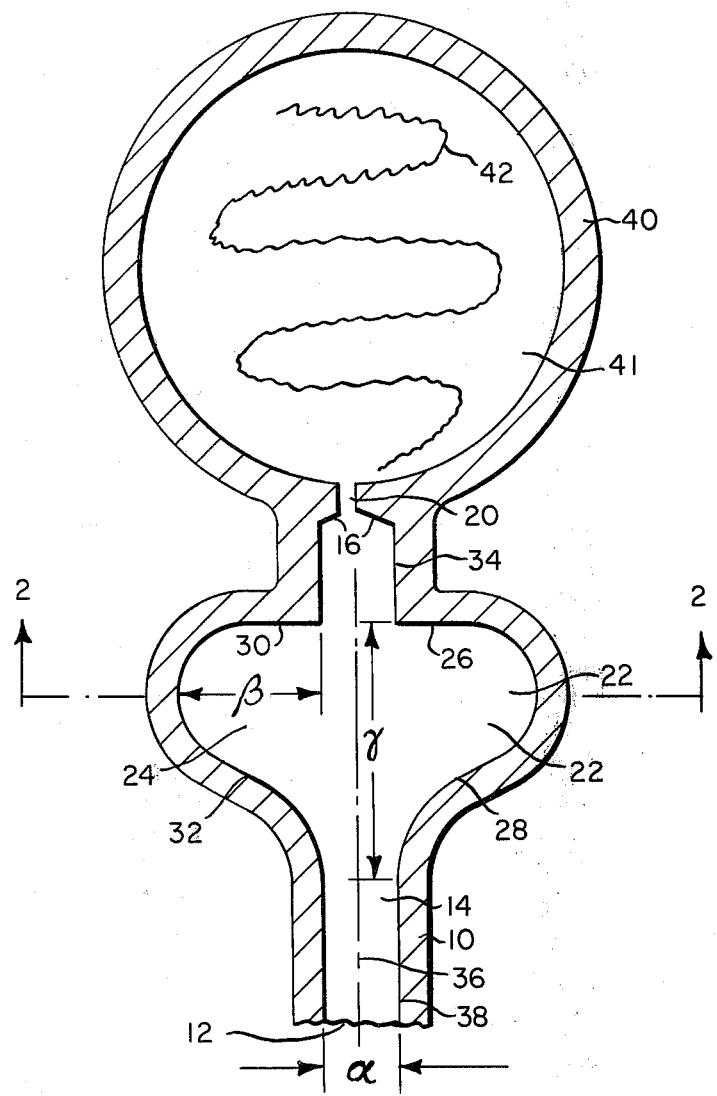
FIG. 1 is a view of a longitudianl section of a preferred embodiment.
Figure 2:
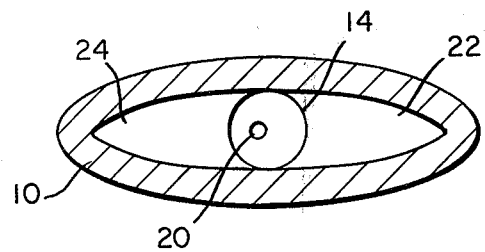
FIG. 2 is a cross-section in elevation taken along the line 2—2 of FIG. 1.

In the form of embodiment shown in these figures, the invention has been shown in combination with a conventional flat circular mould 40 having a mould cavity 41 of generally flat circular cross-section.

Referring more particularly to the drawings, runner 10 defines an elongated runner cavity 14 of generally circular cross-section of diameter α. Inlet 12 of the runner cavity is attached to and communicates with conventional polymer injection apparatus (not shown) to receive molten polymer. The runner cavity is partially restricted by gate land 16 to form gate 20, positioned off the runner cavity axis 36, which communicates with mould cavity 41.

Two additional cavities (22 and 24) are provided in the runner cavity between the inlet and gate land. Additional cavity 22 is formed by sides 26 and 28, side 26 being on the gate land side of cavity 22. Additional cavity 24 is formed by sides 30 and 32, side 30 being on the gate land side of cavity 24. Additional cavities 22 and 24 are of substantially the same size and shape and at substantially the same distance from gate land 16. Gate land 16 is connected to side 26 of additional cavity 22 by side 34 of runner 10, side 34 being of a length not more than three times α, the average diameter of runner cavity 14. Side 26 is substantially at 90° to runner axis 36. Additional cavity 22 is connected to inlet 12 by side 38 of runner 10. Side 38 connects with side 28 of additional cavity 22 in a substantially smooth continuous surface that slopes outwardly from runner axis 36 at a gradually increasing angle that does not exceed about 90°.

Cavity 22, defined by walls 26 and 28, and cavity 24, defined by walls 30 and 32, have a diameter γ at least as large as runner cavity diameter α, where γ is measured from the point where the additional cavity walls meet runner walls 34 and 38. The additional cavities have a length β at least as large as runner cavity diameter α, where β is the distance from where an additional cavity meets the runner cavity 14 to the deepest part of the additional cavity. In a preferred embodiment diameter α is about 0.203 inches, diameter γ is about 0.80 inches, and length β is about 0.2375 inches.

In the process of the present invention, molten polymer is injected into the runner 10 at runner inlet 12. The polymer passes through the runner cavity 14, with some of the polymer flowing into cavities 22 and 24. It is believed that as polymer is subsequently forced out of cavities 22 and 24, it disrupts the plug flow of polymer in runner cavity 14, resulting in a uniform melt flow pattern 42 into the mould. Short moulding cycles, such as 0.5 seconds or longer, can be selected in practicing the invention to mould articles having a more uniform stress than articles moulded under the same moulding conditions using a conventional runner.

In the design of runner for injection moulding apparatus it is well known to incorporate into the runner a cavity known as an overflow or a cold slug well. Such cavities may trap cold slugs of polymer, bubbles, and the like and are usually incorporated into the runner at a bend, for example, a 90° bend in the runner. The addition cavities of the present invention should be placed between any such well and the gate land.

I claim:

1. In an injection moulding apparatus comprising polymer injection means, an elongated runner cavity, a gate land, a gate, and a mold connected in series, the improvement which comprises at least one additional cavity appended to the side of said elongated runner cavity and being open to said runner cavity, said additional cavity being at a maximum distance of three times the average diameter of said runner cavity from said gate land.

2. The apparatus of claim 1 in which the angle formed by the axis of the elongated runner cavity and the edge of the additional cavity nearest the gate land is about 90°.

3. The apparatus of claim 1 in which the runner has at least two additional cavities.

4. The apparatus of claim 3 in which two additional cavities are at substantially the same distance from the gate land.

5. The apparatus of claim 4 in which the angle formed by the axis of the elongated runner cavity and the edge of each additional cavity is about 90° on the side of each additional cavity nearest the gate land, and not greater than about 90° on the side of each additional cavity farthest from the gate land.

6. The apparatus of claim 5 in which the gate is not positioned on the axis of the runner.

7. The apparatus of claim 5 in which the additional cavities have a length at least equal to the average runner diameter and sufficient to produce a uniform melt flow pattern of polymer into the mould.

8. The apparatus of claim 5 in which the additional cavities have a diameter, where said additional cavities contact said runner cavity, equal to about the average runner diameter.

9. The apparatus of claim 5 in which the runner cavity is of circular, semi-circular, or trapezoidal cross-section.

* * * * *